US009021288B2

(12) United States Patent
Adewale et al.

(10) Patent No.: US 9,021,288 B2
(45) Date of Patent: Apr. 28, 2015

(54) METHOD AND APPARATUS FOR RECOVERY FROM LOW POWER STATE (71) Applicant: Apple Inc., Cupertino, CA (US)

(72) Inventors: Fiyinfolu O. Adewale, San Mateo, CA (US); Paul J. Costa, Sunnyvale, CA (US); David R. Cox, Cupertino, CA (US); Michael J. Giles, San Jose, CA (US); Steven I. Kuo, Sunnyvale, CA (US); Nicholas W. Ruhter, San Francisco, CA (US); Steven J. Sfarzo, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 279 days.

(21) Appl. No.: 13/628,000

(22) Filed: Sep. 26, 2012

(65) Prior Publication Data
US 2013/0326251 A1 Dec. 5, 2013

Related U.S. Application Data (60) Provisional application No. 61/653,954, filed on May 31, 2012.

(51) Int. Cl.
G06F 1/32 (2006.01)
(52) U.S. Cl.
CPC ............ G06F 1/3215 (2013.01); G06F 1/3234 (2013.01)
(58) Field of Classification Search
CPC .... G06F 1/3206; G06F 1/3215; G06F 1/3246
USPC .................................................. 713/320, 323
See application file for complete search history.

(56) References Cited

U.S. PATENT DOCUMENTS

| | | | | |
|---|---|---|---|---|
| 6,460,143 B1 * | 10/2002 | Howard et al. | ................ | 713/323 |
| 6,665,805 B1 * | 12/2003 | Tsirkel et al. | ................. | 713/323 |
| 6,760,850 B1 * | 7/2004 | Atkinson et al. | ............... | 713/320 |
| 6,795,926 B1 | 9/2004 | Matula et al. | | |
| 6,795,927 B1 | 9/2004 | Altmejd et al. | | |
| 7,353,413 B2 * | 4/2008 | Dunstan | ........................ | 713/320 |
| 7,437,575 B2 | 10/2008 | Dennis et al. | | |
| 7,689,842 B2 | 3/2010 | Anderson et al. | | |
| 7,707,400 B2 * | 4/2010 | Soin et al. | ......................... | 713/2 |
| 7,900,074 B2 | 3/2011 | Reece et al. | | |
| 8,078,768 B2 | 12/2011 | Manor et al. | | |

(Continued)

OTHER PUBLICATIONS

PCT/US2013/041549. Int'l Search Report (Aug. 23, 2013).

Primary Examiner — Chun Cao
(74) Attorney, Agent, or Firm — Womble Carlyle Sandridge & Rice, LLP (57) ABSTRACT A method and apparatus for recovering from a low power state in a computing system is disclosed. In one embodiment of the method, the computing system enters the low power state from a standard power state after an activity detector indicates a user controlled peripheral device connected to the computer system has been inactive for a period of time. To enter the low power state, the method disconnects the user controlled peripheral device from a host controller, while continuing to supply power to the user controlled peripheral device and shutting off power to the host controller. The method returns the computer system to the standard power state when the activity detector indicates the user controlled peripheral device has become active. To return to the standard power state, power is restored to the host controller and the user controlled peripheral device is reconnected to the host controller.

20 Claims, 11 Drawing Sheets

(56) References Cited

U.S. PATENT DOCUMENTS

| | | |
|---|---|---|
| 8,195,966 B2 * | 6/2012 | Yeh et al. .................. 713/310 |
| 8,219,840 B1 | 7/2012 | Nanda et al. |
| 8,645,671 B2 * | 2/2014 | Soin et al. .................. 713/1 |
| 2003/0051181 A1 * | 3/2003 | Magee et al. .............. 713/320 |
| 2006/0010264 A1 | 1/2006 | Rader et al. |
| 2010/0049881 A1 | 2/2010 | Manor et al. |
| 2010/0199111 A1 * | 8/2010 | Spencer .................... 713/300 |
| 2011/0131427 A1 | 6/2011 | Jorgenson et al. |
| 2011/0271131 A1 * | 11/2011 | Lefebvre et al. .......... 713/323 |

\* cited by examiner

FIG. 1

ADVANCED CONFIGURATION AND POWER INTERFACE (ACPI) SPECIFICATION

- G0 (S0): WORKING
- G1: SLEEPING (SUBDIVIDES INTO FOUR STATES S1 TO S4)
  - S1: ALL PROCESSOR CACHES ARE FLUSHED AND CPU STOPPED. POWER TO CPU AND RAM ARE MAINTAINED. OTHER DEVICES NOT NEEDED MAY BE POWERED DOWN.
  - S2: CPU IS POWERED OFF.
  - S3: STANDBY, SLEEP, OR SUSPEND TO RAM. RAM REMAINS POWERED.
  - S4: HIBERNATION OR SUSPEND TO DISK. ALL CONTENT ON MAIN MEMORY IS SAVED TO HARD DISK.
- G2 (S5): SOFT OFF. ALMOST SAME AS G3, EXCEPT POWER IS SUPPLIED TO POWER BUTTON TO ALLOW RETURN TO S0. A FULL REBOOT IS REQUIRED.
- G3: MECHANICAL OFF. POWER OFF VIA A MECHANICAL SWITCH.

ENTERING A LOW POWER STATE OF OPERATION
(EXITING A STANDARD POWER STATE OF OPERATION)

FIG. 6

EXITING A LOW POWER STATE OF OPERATION
(ENTERING A STANDARD POWER STATE OF OPERATION)

METHOD AND APPARATUS FOR RECOVERY FROM LOW POWER STATE

CROSS-REFERENCE TO RELATED APPLICATION

This application claims priority under 35 U.S.C. 119(e) to U.S. Provisional Patent Application No. 61/653,954, filed May 31, 2012, and entitled "METHOD AND APPARATUS FOR RECOVERY FROM LOW POWER STATE", which is incorporated herein by reference in its entirety and for all purposes.

FIELD OF THE DESCRIBED EMBODIMENTS

The described embodiments relate generally to computing devices and more particularly to mechanisms for resuming regular computing operations after computing operations are suspended to support a low power mode.

BACKGROUND

Computing devices can have several operating states. Each state can be associated with a level of availability of the computing device and each state can have a related amount of power. It is typical for the computing device to transition from a first operating state with a relatively higher power to a second operating state with a relatively lower power if the computing device has been idle for a predetermined period of time. For example, a computing device can be configured to power down a display when the computing device has been idle for an amount of time. To recover from the lower power state to the higher power state, the user can typically move a mouse or touch a keyboard key.

Some states (such as sleep states) can have very low amounts of power associated with them. As a consequence, it can take longer to recover from this low power state and return to a regular operating state. A second consequence is that simply moving the mouse or pressing a keyboard is usually not sufficient to wake the device. This behavior can be due to the fact that at very low power states, many device interfaces have been powered down to save power. Once the interfaces have been powered down, they can be unresponsive to external stimulus. For many computing devices, the only recovery from very low power states can be by the use of the main power switch. Use of the power switch can be non-intuitive since the user did not power down the computing device.

Therefore, what is desired is a reliable way for a computing device to recover from a very low power state, when traditional device interfaces can be powered down, without using the main power switch.

SUMMARY OF THE DESCRIBED EMBODIMENTS

This specification describes various embodiments that relate to methods and apparatus for resuming regular computing operations after computing operations are suspended to support a low power mode. Typically, in order to wake a computer from a low power state of operation using a user controlled peripheral device such as a key board or a mouse, both the peripheral device and the host controller, which the peripheral device is connected to, need to be powered up. In some low power states of operation, such a configuration can require the use of a main power switch to wake the computer. In an embodiment, a new low power state of operation is created, where the peripheral device is powered up while the host controller is powered down. A multiplexer or mux inserted in between the peripheral device and the host controller can break the connection between the two devices in this new low power state, allowing for the two devices to be powered differently. While in this new low power state, a data line connecting the peripheral device to the host connector can be monitored for activity on the peripheral device. When activity is detected on the peripheral device, the computer exits the low power state by restoring power to the host controller and reconnecting the peripheral device to the host controller using the multiplexer. This returns the computer to a standard power state of operation that is associated with regular computing conditions. In one embodiment, this return to the standard power state of operation does not require the use of the main power switch.

In one embodiment, a method for recovering from a low power state of operation for a computing system is disclosed. The method includes the steps of: (1) monitoring activity of a peripheral device connected to the computer system, (2) entering the low power state of operation from a standard power state of operation for the computer system when the monitoring indicates that the peripheral device is inactive for at least a predetermined amount of time, and (3) returning to the standard power state of operation when the monitoring indicates that the peripheral device has become active. In the method, the low power state has a similar or lower power consumption level as a soft off (S5) power state, and returning to the standard power state of operation does not require use of a main power switch. In another embodiment, the monitoring of peripheral device activity is carried out over a data line connecting the peripheral device to the computer system. In a further embodiment, the computing system enters the low power state of operation from the standard power state of operation for the computer system by the following steps: disconnecting the peripheral device from a host controller, continuing to supply power to the peripheral device, and shutting off power to the host controller. In yet another embodiment, the computing system returns to the standard power state of operation by restoring power to the host controller and reconnecting the peripheral device to the host controller.

In one embodiment, a computing system capable of recovering from a low power state of operation includes a processor, a host controller, a user controlled peripheral device connected to the host controller by way of a data line, and a power managing device. The power managing device includes an activity detector configured to detect an activity state of the user controlled peripheral device by monitoring the data line, a management device configured to place the computing system in and out of the low power state of operation in response to the activity state of the user controlled peripheral device as detected by the activity detector, and a multiplexer configured to select to connect the user controlled peripheral device to the host controller or disconnect the user controlled peripheral device from the host controller as directed by the management device. In another embodiment, the management device is further configured to place the computing system in the low power state of operation, in response to the activity detector detecting the user controlled peripheral device is inactive for at least a predetermined amount of time, by the following steps: configuring the multiplexer to disconnect the user controlled peripheral device from the host controller, continuing to supply power to the user controlled peripheral device, and shutting off power to the host controller. In a further embodiment, the management device is further configured to place the computing system out of the low power state of operation, in response to the activity detector detecting the user controlled peripheral device has become active, by the following steps: restoring power to the host controller, and configuring the multiplexer to connect the user controlled peripheral device to the host controller.

In one embodiment, a computer program product encoded in a non-transitory computer readable medium for recovering from a low power state of operation for a computing system is described. The computer program product includes at least the following computer code: (1) computer code for monitoring activity of a user controlled peripheral device connected to the computer system, (2) computer code for entering the low power state of operation from a standard power state of operation for the computer system when the monitoring indicates that the user controlled peripheral device is inactive for at least a predetermined amount of time, and (3) computer code for returning to the standard power state of operation when the monitoring indicates that the user controlled peripheral device has become active. Additionally, the low power state has a similar or lower power consumption level as a soft off (S5) power state, and returning to the standard power state of operation does not require use of a main power switch. In another embodiment, the monitoring of peripheral device activity is carried out over a data line connecting the peripheral device to the computer system. In a further embodiment, the computer program code for entering the low power state of operation from a standard power state of operation for the computer system includes at least the following computer code: computer code for disconnecting the user controlled peripheral device from a host controller, computer code for continuing to supply power to the user controlled peripheral device, and computer code for shutting off power to the host controller. In yet another embodiment, the computer program code for returning the low power state of operation to the standard power state of system includes at least the following computer code: computer code for restoring power to the host controller, and computer code for reconnecting the user controlled peripheral device to the host controller.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

A computing device, such as a personal computer or laptop, can have several operating states that can range from fully on when a CPU (central processing unit) can be powered on and operational to a CPU stop state where the CPU can be powered off but a software state can be saved in random access memory (RAM) to a very low power state where the software state can be saved in a non-volatile memory (such as a hard drive) and then the memory and CPU can be powered off. Some operating states can consume relatively more power than others. Oftentimes, to help conserve energy (and battery life, for mobile devices), the computing device can automatically transition from higher order operating states that can consume relatively more power to lower order operating states that can consume relatively less power.

As an example, if the computing device detects an idle period, the computing device can transition from a fully on state to a state where the display can be turned off while the rest of the computing device continues to run. To return to the fully on state, the user can typically move a mouse or touch a keyboard key. Some operating states can consume very low amounts of power. In order to consume such low amounts, many device interfaces of the computing device are powered down. Often, the only recovery from these very low power operating states is to assert the main power switch. If the computing device has entered this low power state by detecting idle periods (i.e., without the user powering off the computing device), then the recovery from the low power state by asserting the main power switch can be non-intuitive.

In one embodiment, the computing device can include a device interface that can receive power, even when the computing device is in a very low power operating state. The device interface can be coupled to a mouse and/or a keyboard. When the computing device enters a very low power operating state, the output of the device interface can be monitored and if any activity is detected, then the computing device can recover from the very low power operating state.

Figure 1:
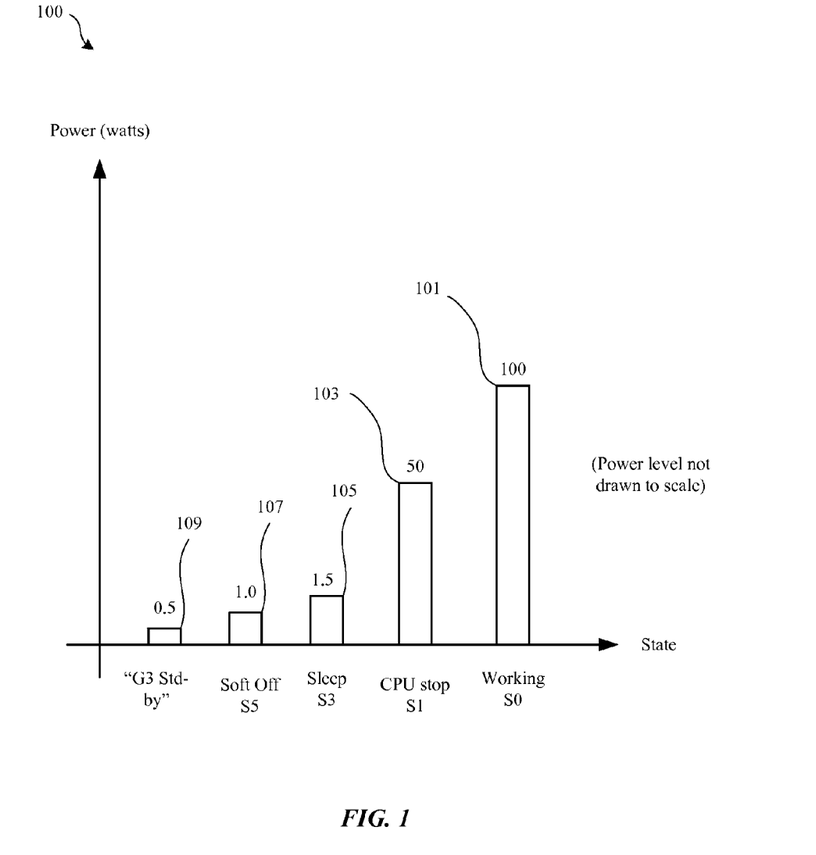
FIG. 1 is a graph of computing device operating states and power levels that can be associated with the different operating states.

FIG. 1 is a graph 100 of computing device operating states and power levels that can be associated with the different operating states. In one embodiment, the operating states can be set forth by an Advanced Configuration and Power Interface (ACPI) specification. When the computing device is fully on and operational, the computing device can be in the working or S0state 101. In this example, S0 state 101 can draw 100 watts of power. S1 state 103 can be a CPU stop state. The CPU stop state can, for example, halt a clock to the CPU to save power. In this example, S1 state 103 consumes 50 watts. S3 state 105 can be a sleep state that consumes 1.5 watts of power. S3 state 105 can power off many of the sub-systems of the computing device, such as CPU, hard drives but continue to power RAM so that the operating state of the computing device can be recovered from RAM when a wake signal is received. S5 state 107 can be a very low power state where a majority of devices and circuits on a computing device is powered off except for a small portion to allow the computing device to wake from this state. In S5 state 107, most interfaces for devices are turned off to save power. Thus, recovering from S5 state 107 is typically from the main power switch. In this example, higher order operating states consume more power and appear to the right end of the graph 100.

In one embodiment, another very low power state can be introduced that can be slightly lower order than S5 state 107. State "G3 standby" 109 can have a similar, or even lower, power consumption level compared to S5 state 107, but can allow keyboard or mouse input as events that can cause the computing device to return to a higher operating state. The use of a keyboard or mouse to wake the computing device can be more intuitive and can improve the user experience.

Figure 2:
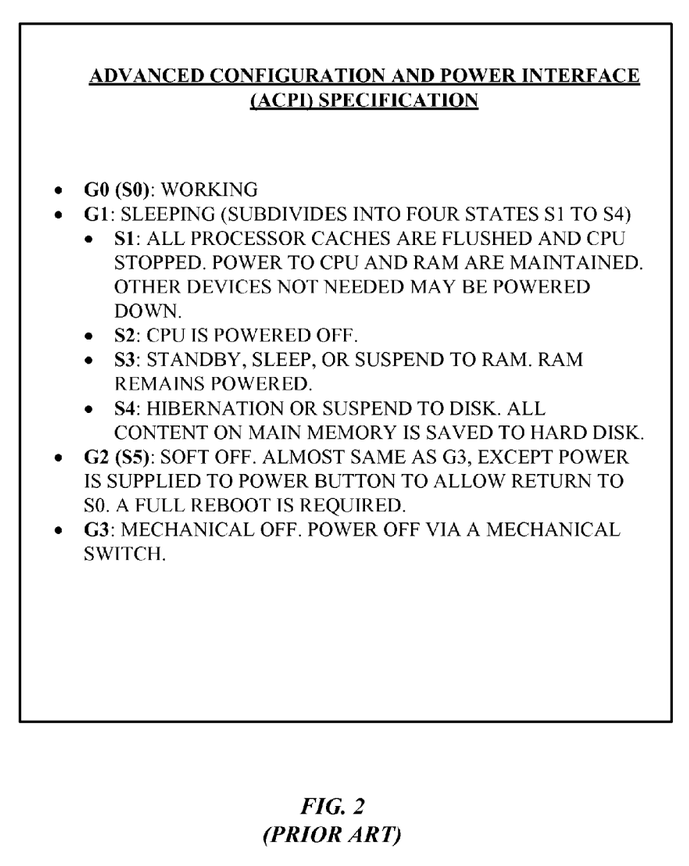
FIG. 2 is an overview of various computing device operating states as defined by the Advanced Configuration and Power Interface (ACPI) specification.

To fully appreciate the functionality of new low power states such as "G3standby" 109, it is helpful to understand more details regarding the various computing device operating states shown in FIG. 1. These details are provided in FIG. 2, which gives an overview of various computing device operating states as defined by the Advanced Configuration and Power Interface (ACPI) specification. The ACPI specification aims to serve as an open power and configuration standards for hardware devices. It defines four Global "Gx" states and six Sleep "Sx" states. The four Global "Gx" states are G0, G1, G2 and G3. The six Sleep "Sx" states are S0, S1, S2, S3, S4 and S5. The G0 (S0) state is a working state. In the G0 (S0) state, the computing device is fully usable. The computing device can save power by entering devices that are not in use to a lower power state. The G1 state is a sleeping state. G1 subdivides into four states, S1 to S4. In S1, all processor caches are flushed and the CPU (central processing unit) is stopped. However, power to the CPU and RAM (random access memory) are maintained. Other devices not needed may be powered down, so S1 consumes less power than S0. S2 is not shown in FIG. 1, but in S2 the CPU is powered off. S3 is commonly referred to as a Standby, Sleep, or Suspend to RAM mode. In S3, CPU is powered off, but RAM remains powered on. Therefore, S3 consumes less power than S1. S4 is not shown in FIG. 1, but in S4 all content on the main memory is saved to hard disk. S4 is commonly referred as a Hibernation or Suspend to Disk mode. The G2 (S5) is a "Soft Off" state. G2 (S5) is almost the same as G3, the "Mechanical Off" state, except power is at least supplied to the power button to allow return of the computing device to the S0 state. However, a full reboot is required. G2 (S5) consumes less power than S3, but more power than G3, the "Mechanical Off" state, which consumes zero power. G3 is a "Mechanical Off" state. The computing device's power has been turned off via a mechanical switch, so it consumes no power. In one embodiment, a very low power state is introduced as the "G3 standby" state. The "G3 standby" state is not defined in the ACPI specification. The "G3 standby" state can be slightly lower order than an S5 state, but is of higher order than the G3 state, which consumes zero power.

Figure 3:
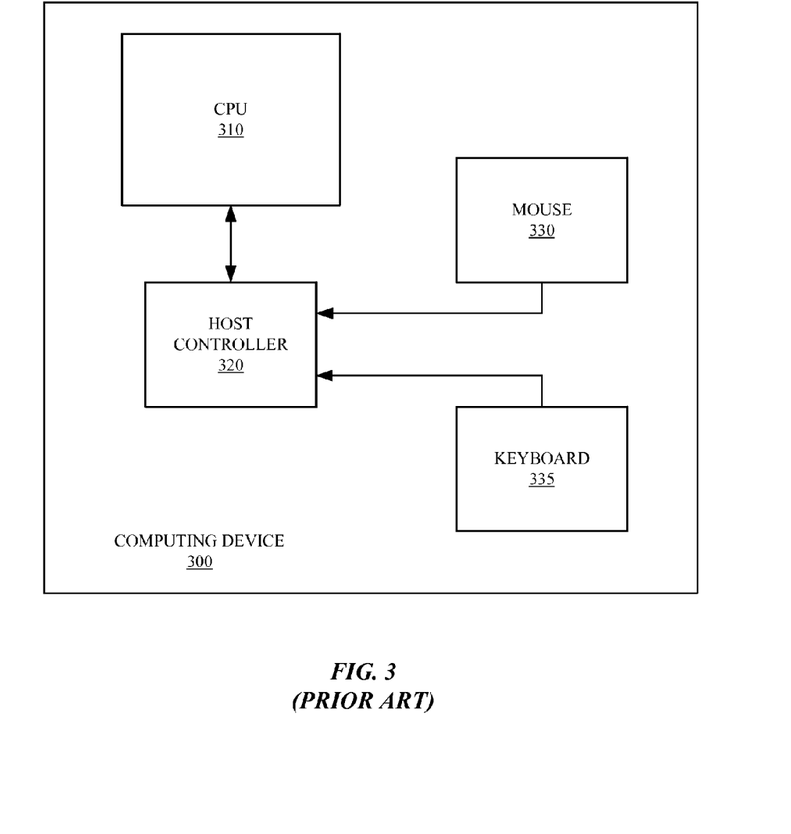
FIG. 3 is a simplified block diagram of a computing device.

FIG. 3 is a simplified block diagram of a computing device 300. Computing device 300 can include a CPU 310, a host controller 320, a mouse 330 and a keyboard 335. Host controller 320 is coupled to CPU 310 and can provide data from mouse 330 and keyboard 335 to CPU 310. In one embodiment, mouse 330 and keyboard 335 can be serial bus devices, such as universal serial bus (USB) devices. In such an embodiment, host controller 320 can be a USB host controller. In another embodiment, mouse 330 and keyboard 335 can be Bluetooth™ devices. In such an embodiment, host controller 320 can be a Bluetooth™ host controller. Typically host controller 320 and CPU 310 can be powered by a common power source. In a very low power state, such as S5 state 107, the common power source can be switched off which means that any input from mouse 330 or keyboard 335 will be ignored by host controller 320 and CPU 310. Therefore, any input from mouse 330 or keyboard 335 can not be used to recover from a very low power state.

Figure 4A:
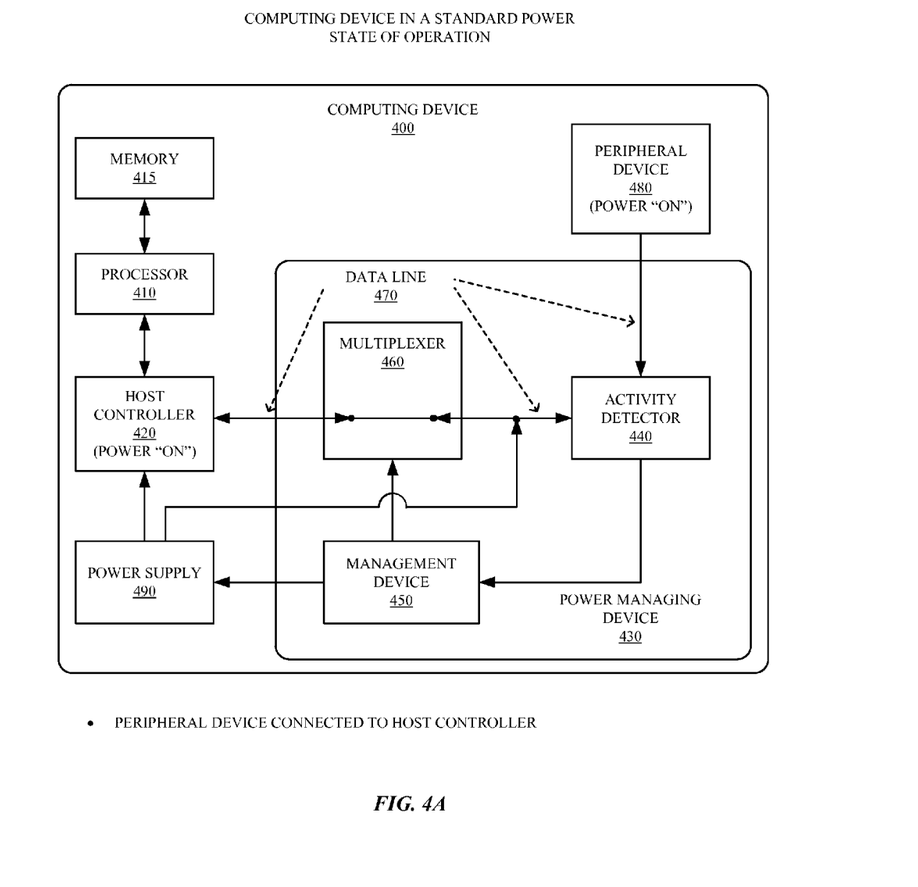
FIG. 4A is a simplified block diagram of a computing device configured in a standard power state of operation in accordance with one embodiment described in the specification.
Figure 4B:
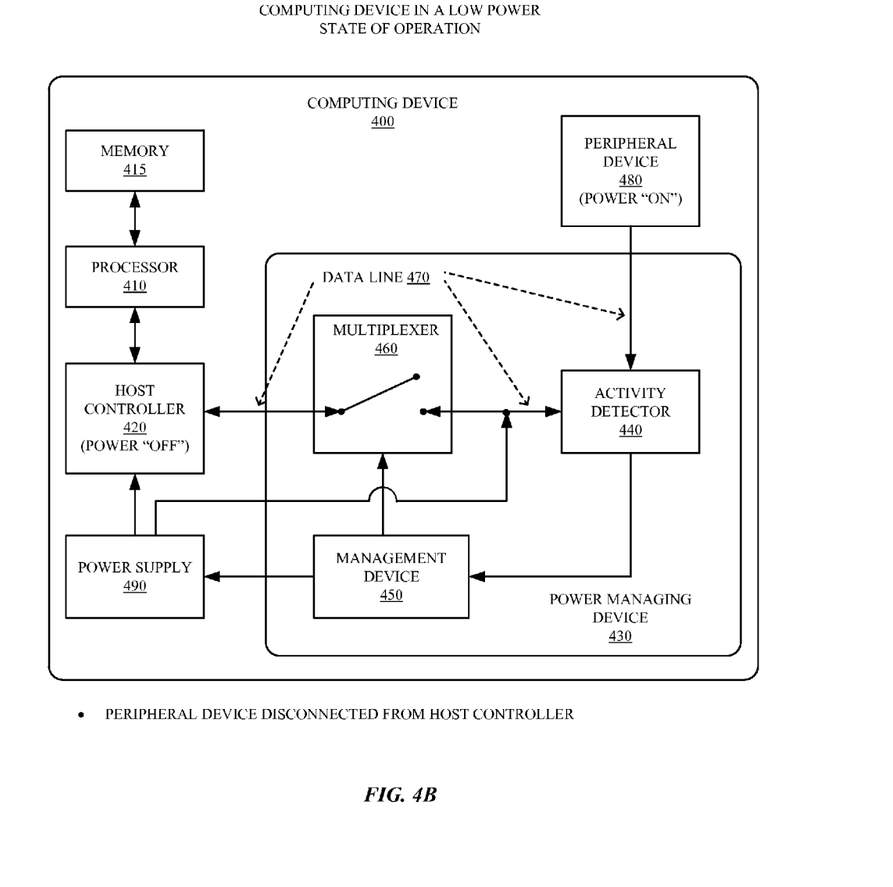
FIG. 4B is a simplified block diagram of a computing device configured in a low power state of operation in accordance with one embodiment described in the specification.

FIGS. 4A and 4B are simplified block diagrams of a computing device configured in a standard/low power state of operation in accordance with one embodiment described in the specification. Computing device 400 is a computing device capable of resuming regular computing operations at standard power state after computing operations are suspended to support a very low power state. In one embodiment, computing device 400 can include a central processing unit (CPU) 410, a memory 415, a host controller 420, a power managing device 430, a peripheral device 480 connected to the host controller 420 by way of a data line 470, and a power supply 490. The power managing device 430 can include an activity detector 440, a management device 450, and a multiplexer 460. The activity detector 440 is configured to detect an activity state of the peripheral device 480 by monitoring the data line 470. In one embodiment, the activity state of the peripheral device 480 is either inactive (i.e., not in use) or active (i.e., in use). For example, if the peripheral device 480 is a mouse, then a mouse not in use would be in the inactive state, while the mouse that is being moved or clicked on would be in the active state. The management device 450 is configured to place the computing device 400 in and out of the low power state of operation in response to the activity state of the peripheral device 480 as detected by the activity detector 440. The multiplexer 460 is configured to either connect the peripheral device 480 to the host controller 420 or disconnect the peripheral device 480 from the host controller 420 as directed by the management device 450.

Applicants submit a replacement specification to correct the use of trademarks. FIG. 4A shows computing device 400 configured in the standard power state of operation. In the standard power state of operation, management device 450 can direct multiplexer 460 to be configured so that host controller 420 is connected to peripheral device 480. Management device 450 can further direct both host controller 420 and peripheral device 480 to be powered "on" by power supply 490. Activity detector 440 detects the activity state of peripheral device 480 by monitoring data line 470 which connects peripheral device 480 to host controller 420. Computing device 400 can be transitioned to a low power state when activity detector 440 detects that peripheral device 480 has been inactive for at least a predetermined amount of time. In one embodiment, the predetermined amount of time can be 15 minutes.

FIG. 4B shows computing device 400 configured in the low power state of operation. In the low power state of operation, management device 450 can direct multiplexer 460 to be configured so that host controller 420 is disconnected from peripheral device 480. Management device 450 can further direct peripheral device 480 to remain powered "on" by power supply 490, while power is shut off from host controller 420. Maintaining power to peripheral device 480 allows activity detector 440 to continue monitoring the activity on peripheral device 480. In other words, peripheral device 480 behaves as if host controller 420 is still turned on. But the fact that power to host controller 420 is actually turned off means that power consumption of computing device 400 is reduced. Furthermore, activity detector 440 can continue to detect the activity state of peripheral device 480 by monitoring data line 470. Computing device 400 can be transitioned back to the standard power state when activity detector 440 detects that peripheral device 480 has become active.

Figure 5:
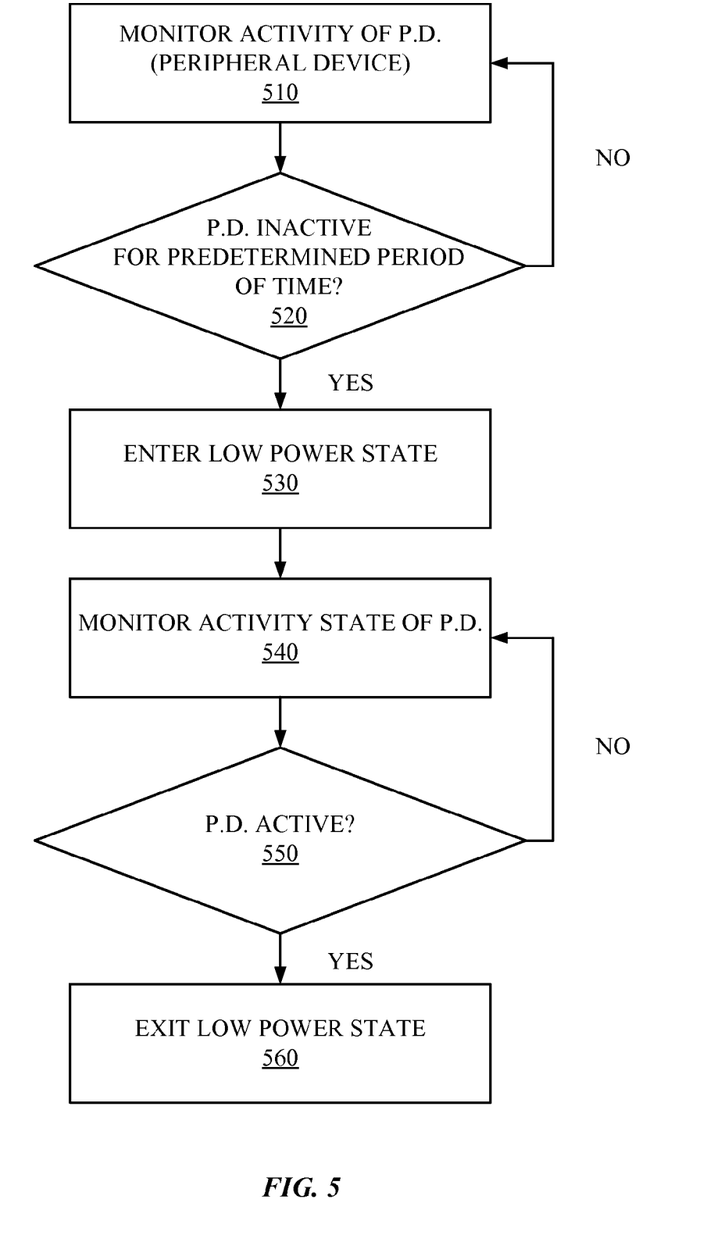
FIG. 5 is a flow chart of method steps for entering a computing device into a low power state from a standard power state, and then returning the computing device to the standard power state from the low power state.

FIG. 5 is a flow chart of method steps for entering a computing device into a low power state from a standard power state, and then returning the computing device to the standard power state from the low power state. The method can begin in step 510 when a computing device monitors the activity of a peripheral device connected to the computer device. In one embodiment, this can be computing device 400 monitoring the activity of peripheral device 480 with activity detector 440. In another embodiment, the peripheral device can be a mouse or a keyboard, and the activity can be moving/clicking a mouse or typing on a keyboard or even inactivity (i.e., no activity). In a further embodiment, the monitoring can be carried out over a data line or data lines connecting the peripheral device to the computing device. In an embodiment, data lines related to a mouse 330 and/or a keyboard 335 can be monitored. In some embodiments, USB data lines related to Bluetooth™ mouse 330 and keyboard 335 can be monitored. In another embodiment, data lines can be monitored that are related to any devices that are to be used to cause the computing device 400 to enter a low power state. In step 520, if the peripheral device is not inactive for a predetermined amount of time, then the method returns to step 510. On the other hand, if the peripheral device remains inactive for a predetermined amount of time, then in step 530 the computing device enters a low power state. In one embodiment, inactivity of the peripheral device 480 can signal a hardware management device 450 to enter the low power state as shown in FIG. 4B. Once the computing device has entered the low power state, step 540 resumes monitoring of the activity of the peripheral device, but now the trigger is for when the peripheral device becomes active. In step 550, if the peripheral device has not become active, then the method returns to step 540. On the other hand, if the peripheral device has become active, then in step 560 the computing device exits the low power state. In one embodiment, when the peripheral device 480 becomes active, that can signal a hardware management device 450 to exit the low power state and enter the standard power state. In another embodiment, entering the standard power state can mean that the method returns to step 510 after step 560, a flow step which is not shown in FIG. 5.

Figure 6:
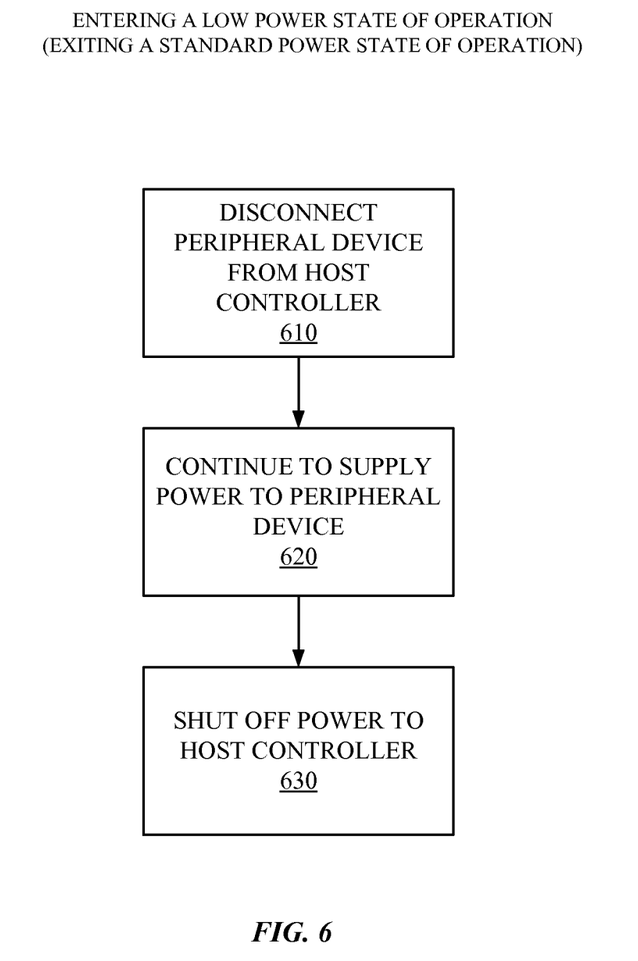
FIG. 6 is a flow chart showing detailed method steps for a computing device to enter into a low power state from a standard power state.

FIG. 6 is a flow chart showing detailed method steps for a computing device to enter into a low power state from a standard power state. The steps of FIG. 6 can be considered as an embodiment of step 530 from FIG. 5. The method can begin in step 610 with disconnecting a peripheral device from a host controller. In one embodiment, this can be management device 450 directing multiplexer 460 of computing device 400 to disconnect peripheral device 480 from host controller 420. This disconnection allows the peripheral device and the host controller to be powered differently. In step 620, the method continues to supply power to the peripheral device. In one embodiment, management device 450 directs power supply 490 to continue supplying power to peripheral device 480. In step 630, the method shuts off power to the host controller. In one embodiment, management device 450 directs power supply 490 to stop supplying power to host controller 420. An embodiment of a computer device in a low power state of operation can be seen in FIG. 4B.

Figure 7:
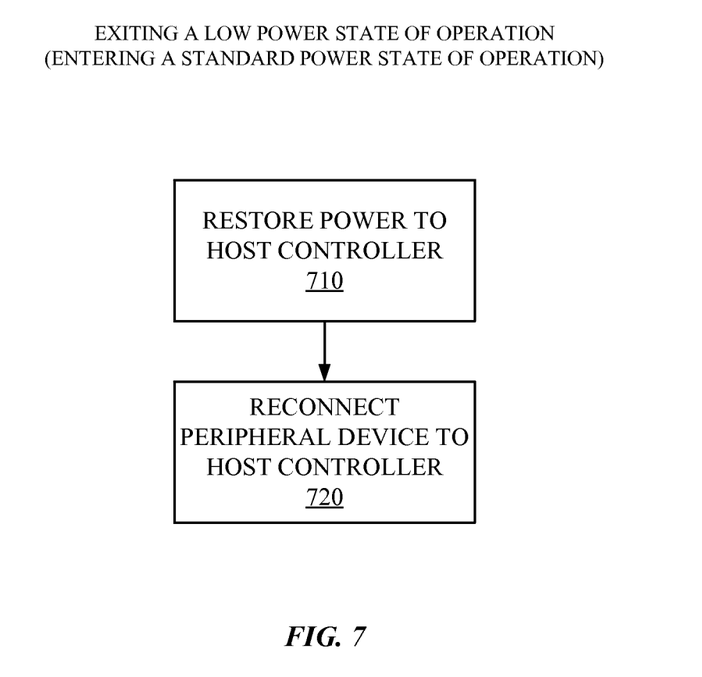
FIG. 7 is a flow chart showing detailed method steps for a computing device to exit from a low power state and return to a standard power state.

FIG. 7 is a flow chart showing detailed method steps for a computing device to exit from a low power state and return to a standard power state. The steps of FIG. 7 can be considered as an embodiment of step 560 from FIG. 5. The method can begin in step 710 with restoring power to a host controller. In one embodiment, this can be management device 450 directing power supply 490 to restore power to host controller 420. In step 720, the method reconnects the peripheral device to the controller host. In one embodiment, management device 450 directs multiplexer 460 to reconnect peripheral device 480 to host controller 420. In the method, power supply to the peripheral device is maintained during and after the exit from the low power state. In one embodiment, the power supply to the peripheral device can come from power supply 490. In another embodiment, the power supply to the peripheral device can come from the host controller 420 after the host controller has been powered back up. Additionally, an embodiment of a computer device in a standard power state of operation can be seen in FIG. 4A.

Figure 8A:
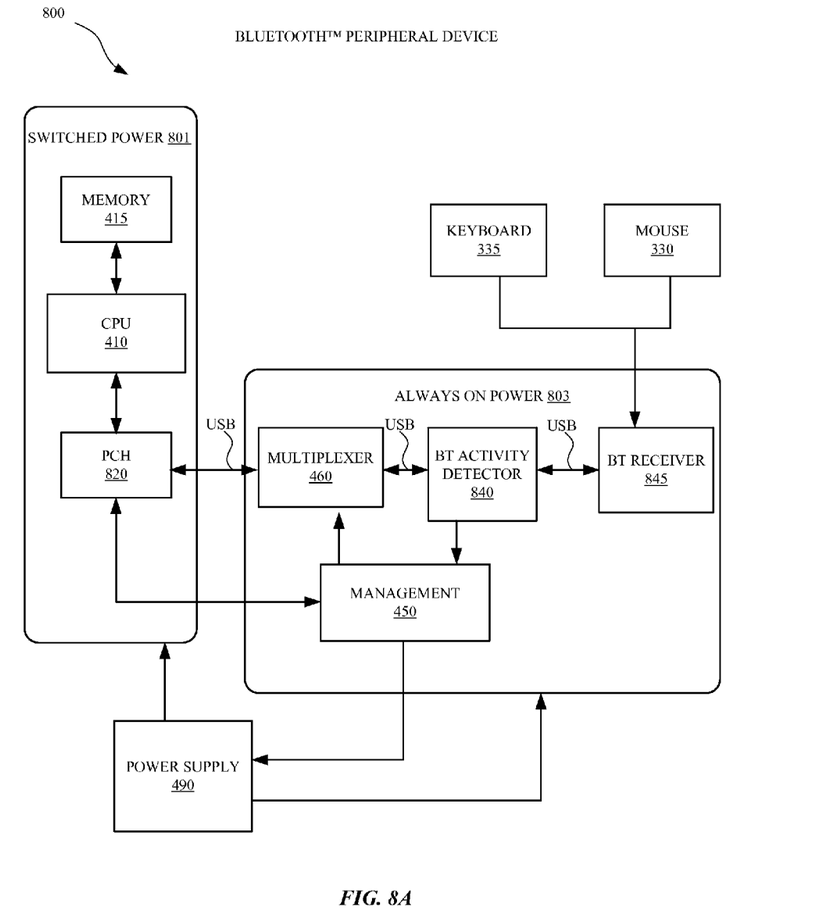
FIG. 8A is a simplified block diagram of a computing system configured to support a low power state of operation with a Bluetooth™ peripheral device.

FIG. 8A is a simplified block diagram of a computing system configured to support a low power state of operation with a Bluetooth™ peripheral device. Computing device 800 can include power supply 490. Power supply 490 can have at least two different outputs. A first output can be a switched power output 801. Switched power output 801 can be turned on or off depending on an operational state of computing device 800. A second output can be always on power output 803. Always on power output 803 typically remains on independent of the operational state of computing device 800.

Switched power output 801 can supply power for the majority of the components included in computing device 800. As shown in FIG. 8A, CPU 410, memory 415 and platform controller hub (PCH) 820 can be powered by switched power output 801. Computing device 800 can include other components powered by switched power output 801, not shown here, such as graphics controllers, Ethernet interfaces, wireless network devices and the like.

Always on power output 803 can supply power to a limited number of components; typically the components relied upon for determining, at least in part, at least one operating state of computing device 800. In one embodiment, Bluetooth™ receiver 845, Bluetooth™ activity detector 840 and management device 450 can be powered by always on power output 803. In some embodiments, keyboard 335 and mouse 330 devices can be Bluetooth™ devices. During normal operation, for example in state S0 101, data from Bluetooth™ keyboard and Bluetooth mouse can be received by Bluetooth™ receiver 845, converted to USB data and be coupled to PCH 820. CPU 410 can receive keyboard 335 and mouse 330 data from PCH 820 and use the data to affect or interact with programs, for example.

When computing device 800 is in a low power state, such as "G3 standby" state 109, switched power output 801 can be switched off, powering down all components that are supplied power through switched power 801. Always on power output 803 can remain on, however, allowing the computing device 800 to continue to receive Bluetooth™ data. If computing device 800 is in a low power state, such as "G3 standby" state 109, the Bluetooth™ activity can be monitored by Bluetooth™ activity detector 840. If Bluetooth™ activity, such as Bluetooth™ data, is detected, then Bluetooth™ activity detector 840 can signal hardware management device 450. Hardware management device 450 can signal power supply 490 to turn on and provide power to switched power output 801 and also signal computing device 800 to recover from a low power state.

Figure 8B:
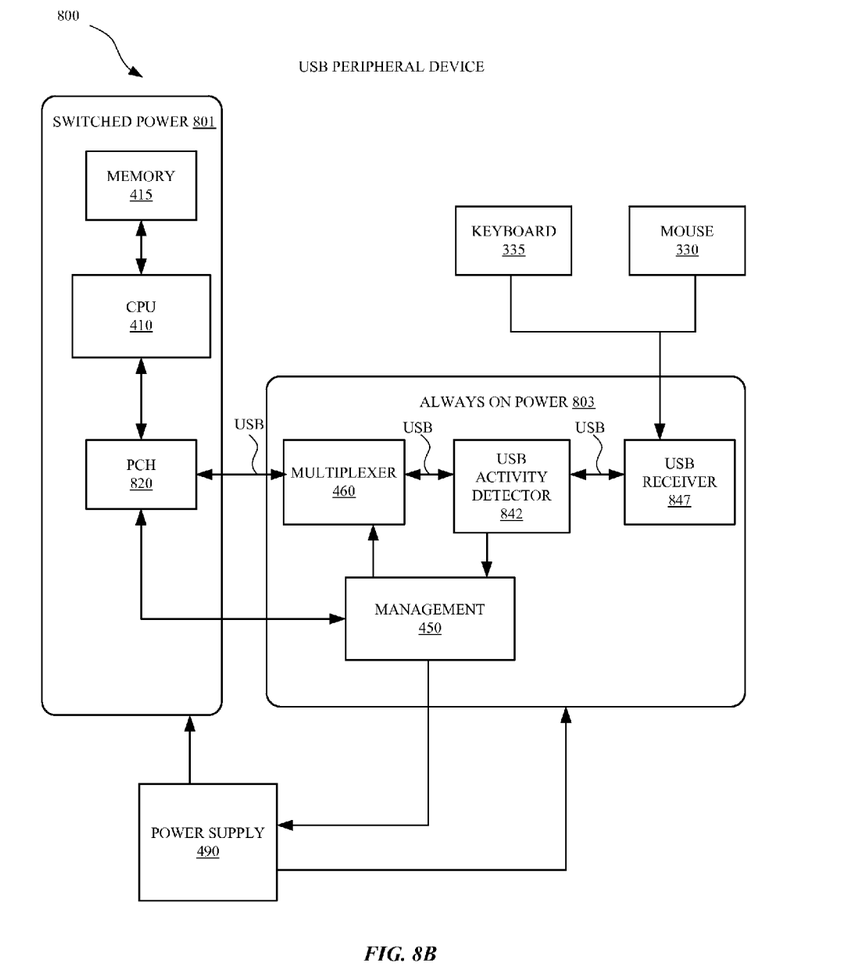
FIG. 8B is a simplified block diagram of a computing system configured to support a low power state of operation with a USB (universal serial bus) peripheral device.

In one embodiment, Bluetooth™ activity detector 840 can be implemented, at least in part, as a Bluetooth™ signal receiver. When Bluetooth™ data is received and recognized by the Bluetooth™ signal receiver, then the received data can provide a signal to hardware management device 450. In another embodiment, computing device 800 may include a USB capable mouse 330 and keyboard 335. In such an embodiment, Bluetooth™ receiver 845 can be replaced with a USB receiver 847 and Bluetooth™ activity detector 840 can be replaced with USB activity detector 842. This USB embodiment is shown in FIG. 8B, which is a simplified block diagram of a computing system configured to support a low power state of operation with a USB (universal serial bus) peripheral device. A similar approach can be made for legacy serial or PS2 keyboard 335 and mouse 330.

Figure 9:
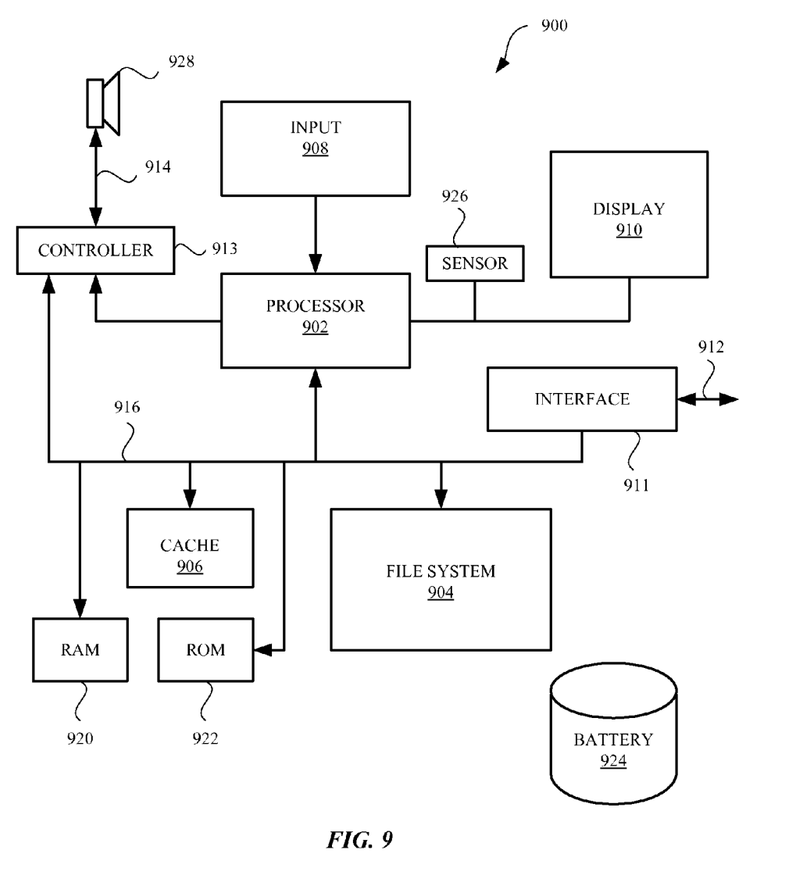
FIG. 9 is a block diagram of an electronic device suitable for implementing some of the described embodiments.

FIG. 9 is a block diagram of an electronic device suitable for controlling some of the processes in the described embodiment. Electronic device 900 can illustrate circuitry of a representative computing device. Electronic device 900 can include a processor 902 that pertains to a microprocessor or controller for controlling the overall operation of electronic device 900. Electronic device 900 can include instruction data pertaining to operating instructions, such as instructions for implementing and controlling a user equipment, in a file system 904 and a cache 906. File system 904 can be a storage disk or a plurality of disks. In some embodiments, file system 904 can be flash memory, semiconductor (solid state) memory or the like. The file system 904 can typically provide high capacity storage capability for the electronic device 900. However, since the access time for the file system 904 can be relatively slow (especially if file system 904 includes a mechanical disk drive), the electronic device 900 can also include cache 906. The cache 906 can include, for example, Random-Access Memory (RAM) provided by semiconductor memory. The relative access time to the cache 906 can be substantially shorter than for the file system 904. However, cache 906 may not have the large storage capacity of file system 904. Further, file system 904, when active, can consume more power than cache 906. Power consumption often can be a concern when the electronic device 900 is a portable device that is powered by battery 924. The electronic device 900 can also include a RAM 920 and a Read-Only Memory (ROM) 922. The ROM 922 can store programs, utilities or processes to be executed in a non-volatile manner. The RAM 920 can provide volatile data storage, such as for cache 906.

Electronic device 900 can also include user input device 908 that allows a user of the electronic device 900 to interact with the electronic device 900. For example, user input device 908 can take a variety of forms, such as a button, keypad, dial, touch screen, audio input interface, visual/image capture input interface, input in the form of sensor data, etc. Still further, electronic device 900 can include a display 910 (screen display) that can be controlled by processor 902 to display information, such as web pages, to the user. Data bus 916 can facilitate data transfer between at least file system 904, cache 906, processor 902, and input/output (I/O) controller 913. I/O controller 913 can be used to interface with and control different devices such as speakers, ear buds, microphone or video cameras through appropriate codecs. For example, control bus 914 can be used to control speaker 928.

Electronic device 900 can also include a network/bus interface 911 that couples to data link 912. Data link 912 can allow electronic device 900 to couple to a host computer or to accessory devices or to other networks such as the internet. The data link 912 can be provided over a wired connection or a wireless connection. In the case of a wireless connection, network/bus interface 911 can include a wireless transceiver, such as a wireless transceiver configured to transmit and receive data according to the LTE protocol. Sensor 926 can take the form of circuitry for detecting any number of stimuli. For example, sensor 926 can include any number of sensors for monitoring a environmental conditions such as for example a Hall Effect sensor responsive to external magnetic field, an audio sensor, a light sensor such as a photometer, computer vision sensor to detect clarity, a temperature sensor and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium executable by a processor. The computer readable medium is any data storage device that can store data which can thereafter be read by a computer system. Examples of the computer readable medium include read-only memory, random-access memory, CD-ROMs, HDDs, SSDs (solid-state drives), DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for recovering from a low power state of operation for a computing system, the method comprising:
 monitoring activity of a peripheral device via a data line, the data line connected between a peripheral device interface and a host controller of a computer system;
 when the peripheral device enters an inactive state for a period of time:
  powering off the host controller,
  disconnecting the host controller from the peripheral device interface by opening a switch coupled to the data line, and
  providing power to the peripheral device interface for enabling activity monitoring of the peripheral device via the data line; and when the peripheral device becomes active:
  powering on the host controller,
  connecting the host controller to the peripheral device interface by closing the switch, and
  providing power to the peripheral device interface for enabling activity monitoring of the peripheral device via the data line.

2. The method of claim 1, wherein the monitoring is carried out by an activity monitor separate from the host controller.

3. The method of claim 1, wherein the switch is a multiplexer and opening the switch includes providing a high or low signal to the multiplexer.

4. The method of claim 1, wherein the data line is configured to supply an output of the peripheral device interface to an activity monitor and the host controller.

5. The method of claim 1, wherein the peripheral device interface is a communication port in communication with the peripheral device, and the peripheral device is a wireless input device.

6. The method of claim 5, wherein providing power to the peripheral device interface comprises:
  supplying power from an always on power output of a power supply.

7. The method of claim 6, wherein monitoring activity of the peripheral device includes monitoring a wireless signal output by the wireless input device.

8. The method of claim 7, wherein the wireless input device comprises one of the following:
  a mouse, a keyboard, a touch screen, a microphone or a webcam.

9. The method of claim 8, wherein the wireless input device is a Bluetooth device or a USB (universal serial bus) device.

10. A computing system capable of recovering from a low power state of operation, the computing system comprising:
  a processor;
  a host controller;
  a peripheral device interface connected to the host controller by way of a data line;
  a power managing device, configured to perform steps that include:
    monitoring an activity state of a peripheral device by monitoring the data line;
    when the peripheral device enters an inactive state for a period of time:
      powering off the host controller,
      disconnecting the host controller from the peripheral device interface by opening a switch coupled to the data line, and
      providing power to the peripheral device interface for enabling activity monitoring of the peripheral device via the data line; and when the peripheral device becomes active:
      powering on the host controller,
      connecting the host controller to the peripheral device interface by closing the switch, and
      providing power to the peripheral device interface.

11. The computing system of claim 10, wherein the computing system is a portable computing device.

12. The computing system of claim 10, wherein the switch is a multiplexer and opening the switch includes providing a high or low signal to the multiplexer.

13. The computing system of claim 10, wherein the peripheral device interface is a communication port in communication with the peripheral device, and the peripheral device is a wireless input device.

14. The computing system of claim 13, wherein monitoring activity of the peripheral device interface includes monitoring a wireless signal output by the wireless input device.

15. The computing system of claim 13, wherein power to the peripheral device interface is supplied from an always on power output of a power supply.

16. The computing system of claim 13, wherein the wireless input device is a Bluetooth device or a USB (universal serial bus) device.

17. A non-transitory computer-readable medium storing instruction that, when executed by a processor included in a computer system, cause the computer system to carry out steps that include:
  monitoring activity of a peripheral device interface via a data line, the data line between the peripheral device interface and a host controller of the computer system;
  when a peripheral device enters an inactive state for a period of time:
    powering off the host controller,
    disconnecting the host controller from the peripheral device interface, and
    providing power to the peripheral device interface for enabling activity monitoring of the peripheral device via the data line; and
  when the peripheral device becomes active:
    powering on the host controller,
    connecting the host controller to the peripheral device interface, and
    providing power to the peripheral device interface.

18. The non-transitory computer-readable medium of claim 17, wherein the peripheral device interface is a communication port in communication with the peripheral device, and the peripheral device is a wireless input device.

19. The non-transitory computer-readable medium of claim 17, wherein the monitoring is carried out by an activity monitor separate from the host controller.

20. The non-transitory computer-readable medium of claim 17, wherein the host controller is disconnected from the peripheral device interface by sending a switching signal to a multiplexer connected between the host controller and the peripheral device interface.

* * * * *